United States Patent
Mondal et al.

(10) Patent No.: US 10,630,905 B2
(45) Date of Patent: Apr. 21, 2020

(54) REAL TIME SHADOW AND GLARE ANALYSIS FOR DOCUMENT CAPTURE

(71) Applicant: Adobe Inc., San Jose, CA (US)

(72) Inventors: Prasenjit Mondal, District-Wide Midnapore (IN); Anuj Shara, Roop Nagar (IN); Ankit Bal, Noida (IN)

(73) Assignee: Adobe Inc., San Jose, CA (US)

( * ) Notice: Subject to any disclaimer, the term of this patent is extended or adjusted under 35 U.S.C. 154(b) by 23 days.

(21) Appl. No.: 16/116,764

(22) Filed: Aug. 29, 2018

(65) Prior Publication Data
US 2020/0077005 A1 Mar. 5, 2020

(51) Int. Cl.
*H04N 5/235* (2006.01)
*G06K 9/00* (2006.01)

(52) U.S. Cl.
CPC ....... *H04N 5/2351* (2013.01); *G06K 9/00442* (2013.01); *H04N 5/2354* (2013.01)

(58) Field of Classification Search
CPC . H04N 5/2351; H04N 5/2354; G06K 9/00442
See application file for complete search history.

(56) References Cited

U.S. PATENT DOCUMENTS

| 9,503,612 B1* | 11/2016 | Pashintsev | H04N 1/4097 |
| 2009/0028424 A1* | 1/2009 | Sato | G06T 5/007 |
| | | | 382/162 |
| 2018/0121746 A1* | 5/2018 | Irrgang | G06K 9/344 |
| 2019/0254143 A1* | 8/2019 | Hallack | G06T 7/00 |

* cited by examiner

*Primary Examiner* — Nicholas G Giles
(74) *Attorney, Agent, or Firm* — SBMC

(57) ABSTRACT

There are described mobile devices, and methods thereof, for real time analyses of captured images. The device determines whether a light level of a first image meets or exceeds a low light threshold. The device also determines whether a shadow level of the first image meets or exceeds a shadow threshold in response to determining the light level does not meet or exceed the low light threshold. The light source is activated in response to determining the light level meets or exceeds the low light threshold or the shadow level meets or exceeds the shadow threshold. The device further determines whether a glare level of a second image meets or exceeds a glare threshold in response to identifying the second image. If so, then a final image is captured with the light source inactive. Otherwise, the final image is captured with the light source active.

20 Claims, 9 Drawing Sheets

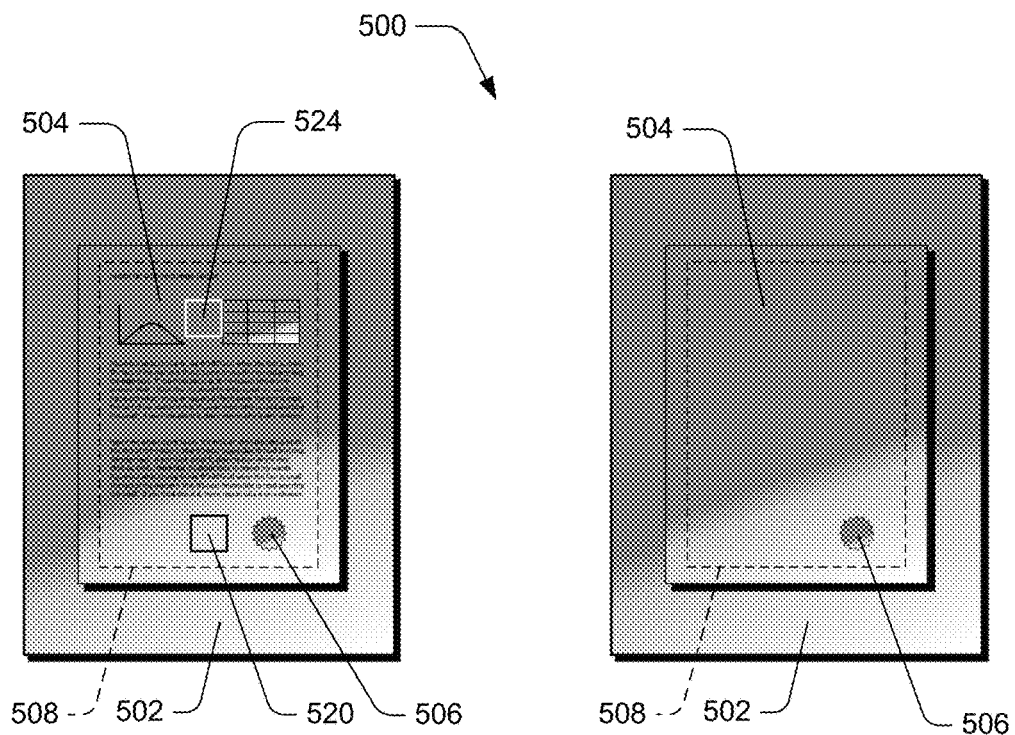
*Fig. 5A*   *Fig. 5B*
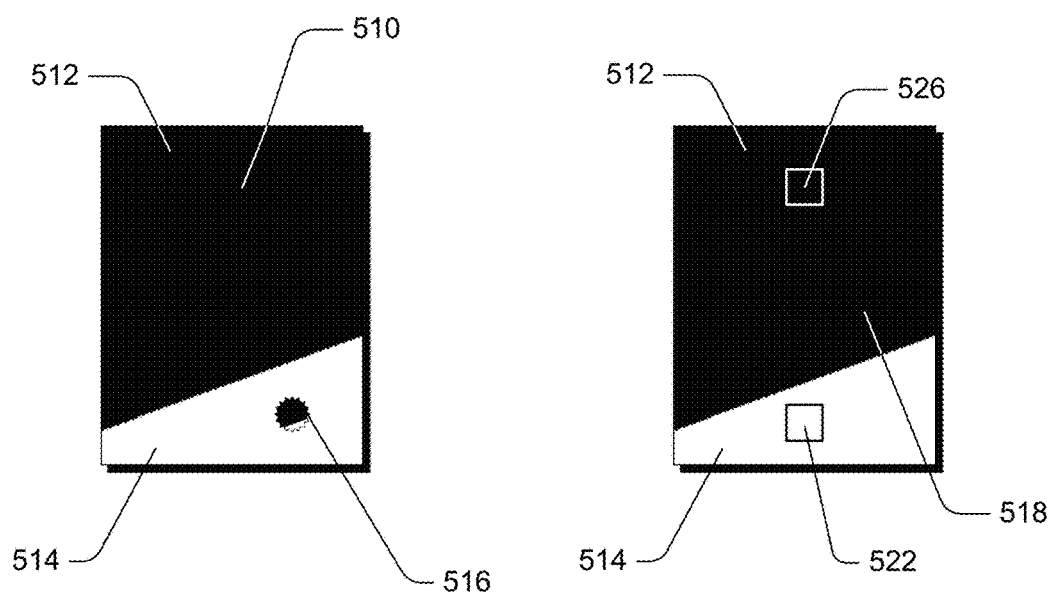
*Fig. 5C*   *Fig. 5D*

REAL TIME SHADOW AND GLARE ANALYSIS FOR DOCUMENT CAPTURE

BACKGROUND

Mobile devices often include cameras, so they are commonly used to capture images. The cameras of mobile devices are designed for capturing natural images but, with the advancement of high resolution cameras, many mobile devices are used to capture document images as well, thus replacing devices dedicated to document scanning Generally, a mobile device captures a photo of a document, converts the captured photo to a document format, and saves the document in the document format at the device. The mobile device provides a fast and easy way to capture receipts, business cards, business documents, a book cover, whiteboards, and the like.

In contrast to other types of document scanners, a mobile device is best positioned a certain distance away from a target document because of the optical nature of the camera, similar to optical cameras optimized for capturing natural images. Due to this gap between the mobile device and the target document, the captured image is subject to problems specific to the device, such as irregular lighting conditions, dark shadows, and potential glare. For example, lighting conditions may be conditioned on ambient light sources in proximity to the mobile device. Also, dark shadows may be caused by objects positioned between a light source and the target document, such as the mobile device itself. In addition, potential glare may be caused by light reflected from the surface of the target document.

Conventional devices address the problems associated with luminance, shadows, and glare for scanned documents with post-processing techniques, i.e., processing of images after capture. Captured images may be processed by image editing and graphic design applications in an attempt to enhance the images after-the-fact. Unfortunately, the capabilities of these applications to enhance the images are limited to whatever information is available after the images are captured.

Beyond post-processing, some conventional applications for mobile devices attempt to compensate for low ambient light conditions and intrusive shadows for document images. However, these conventional applications fall short for many situations. For example, the light sensors for the mobile devices often fail to identify illumination issues for document capture, because the light sensors are calibrated for capturing natural images. Also, these conventional applications have difficulty with removing dark or hard shadows from document images, thus creating problems with processing the document images tainted with these shadows. Thus, conventional applications still have limitations when attempting to address the problems of capturing document images.

SUMMARY

Mobile devices and techniques for real time image processing of captured document images are described that address problems associated with luminance, shadows, and glare. The devices and techniques determine in real time whether to use a light source of the device, and how to use the light source, when imaging a document. Real time processing techniques are utilized for analyzing and addressing luminance, shadowing, and glare issues in advance of image capture.

The image quality of a captured document image may be improved substantially by processing images acquired by the imager of the mobile device and managing a light source of the mobile device in real time, i.e., just before final image capture. Adjustments to the light source may be based on the images acquired by the imager, as processed by the mobile device. Activation of the light source may be effective to reduce poor lighting or excessive shadowing, but the light source may aggravate glare of the object to be captured. Thus, the imager acquires images of the object before capturing the final images in order to determine how to manage the light source to minimize these potential document capture issues.

One aspect is a method implemented by a mobile device having an imager and a light source in an environment for real time detection of a document image to be captured. After one or more first images captured by the imager are captured, the mobile device determines whether a light level of the first images meets or exceeds a low light threshold. The mobile device also determines whether a shadow level of the first images meets or exceeds a shadow threshold in response to determining that the light level of the first images does not meet or exceed the low light threshold. The light source is activated in response to determining that the light level of the first images meets or exceeds the low light threshold, or in response to determining that the shadow level of the first images meets or exceeds the shadow threshold. Next, after capturing one or more second images captured by the imager, the mobile device captures a final image by the imager with the light source inactive based on a glare level of the second images meets or exceeds a glare threshold. If the mobile device determines that the glare level does not meet or exceed the glare threshold, then the final image is captured by the imager while the light source is active.

Another aspect is a mobile device for real time analyses of images to be captured, where the mobile device includes an imager, one or more processors that implement a document capture module, and a light source. The imager can capture one or more first images of an object and one or more second images of the object. The processor and/or the document capture module can determine whether a light level of the first images meets or exceeds a low light threshold, determine whether a shadow level of the first images meets or exceeds a shadow threshold based on the light level of the first images do not meet or exceed the low light threshold, and determine whether a glare level of the second images meets or exceeds a glare threshold. Based on the determinations by the processor and/or the document capture module, the light source activates in response to the light level of the first images meeting or exceeding the low light threshold, the shadow level of the first images meeting or exceeding the shadow threshold, and the glare level of the second images does not meet or exceed the glare threshold. Alternatively, the light source may inactivate in response to the light level of the first image does not meet or exceed the low light threshold, the shadow level of the first image does not meet or exceed the shadow threshold, and the glare level meets or exceeds the glare threshold.

Yet another aspect is a method implemented by a mobile device having an imager and a light source in an environment for real time detection of a document image to be captured. A light source is activated as a part of an image capture operation of the mobile device and, in response, one or more preliminary images are captured by the imager. The mobile device determines whether a glare level of the preliminary images meets or exceeds a glare threshold in response to capturing the preliminary images. The light source is inactivated and a final image is captured by the imager in response to determining that the glare level of the preliminary images meets or exceeds the glare threshold. The final image is capture by the imager while the light source is active in response to determining that the glare level of the preliminary images do not meet or exceed the glare threshold.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIGS. 5A-5D depict a document image processed for dark shadow detection in accordance with the document capture techniques described herein.

DETAILED DESCRIPTION

Overview

Figure 1A:
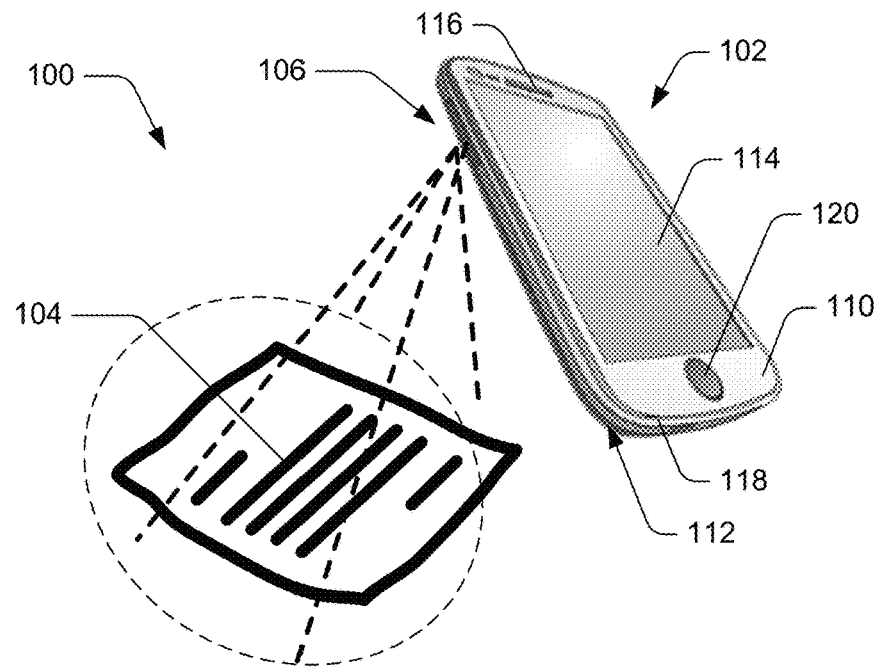
FIGS. 1A and 1B are illustrations of an environment in an example implementation that is operable to employ document capture techniques described herein.

While the present invention is susceptible of embodiment in various forms, there is shown in the drawings and will hereinafter be described presently embodiments with the understanding that the present disclosure is to be considered an exemplification of the invention and is not intended to limit the invention to the specific embodiments illustrated. One skilled in the art will hopefully appreciate that elements in the figures are illustrated for simplicity and clarity and have not necessarily been drawn to scale. For example, the dimensions of some of the elements in the figures may be exaggerated relative to other elements with the intent to help improve understanding of the aspects of the embodiments being illustrated and described.

Document capture devices and techniques are described using various components of a mobile device including an imager and a light source. These devices and techniques support increased quality output of captured images by pre-processing preliminary images acquired by the imager prior to capturing a final document image. These devices and techniques process the acquired images in real time just before the final document image is actually captured in order to minimize illumination, shadowing, and glare issues. In doing so, these devices and techniques overcome limitations of conventional techniques by analyzing characteristics of the preliminarily images in a specific order and triggering the light source based on the analyzed characteristics before capturing the final document image. As a result, the quality of the captured final document image is maximized, i.e., with proper lighting, minimal or no shadows, and minimal or no glare, so that the final image quality, with or without post-processing, will be optimized.

Conventional applications activate a flash of a mobile device in low ambient light conditions, but activation of the flash is governed by the device camera. The ambient light parameters for the device camera are configured for natural image capture so, as a result, the mobile device does not often trigger the flash as needed for document image capture. The document capture techniques described herein recognizes that document images benefit more from better lighting conditions than ambient lighting conditions, so the light source of the mobile device is triggered by the ambient lighting conditions of the document image as captured by the imager.

Conventional applications also apply techniques for automatically detecting and removing shadows from document images, but a common problem is the removal of dark or hard shadows. These dark or hard shadows often overlap the document image, thus hindering any processing of the document image. Document capture techniques described herein identifies situations when a document image has dark or hard shadows and triggers the light source to minimize their negative effect on processing the document image.

Conventional techniques are further subject to glare issues, because the use of a flash or other lighting torch may introduce glare in the captured document image. Introduction of glare degrades image quality by removing or obscuring image content. For the devices and techniques described herein, the light source is controlled to identify any potential glare issues and adjust the light source accordingly, in real time. In particular, the light source is activated to identify any regions of glare in the preliminarily acquired images, and the device determines whether the light source should be active when capturing the final document image based on any identified regions of glare. In this way, the document capture system may improve the quality of the final document image. Thus, a better image may be captured by activating the light source for low light and dark shadow conditions and inactivating the light source where glare is present.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1B:
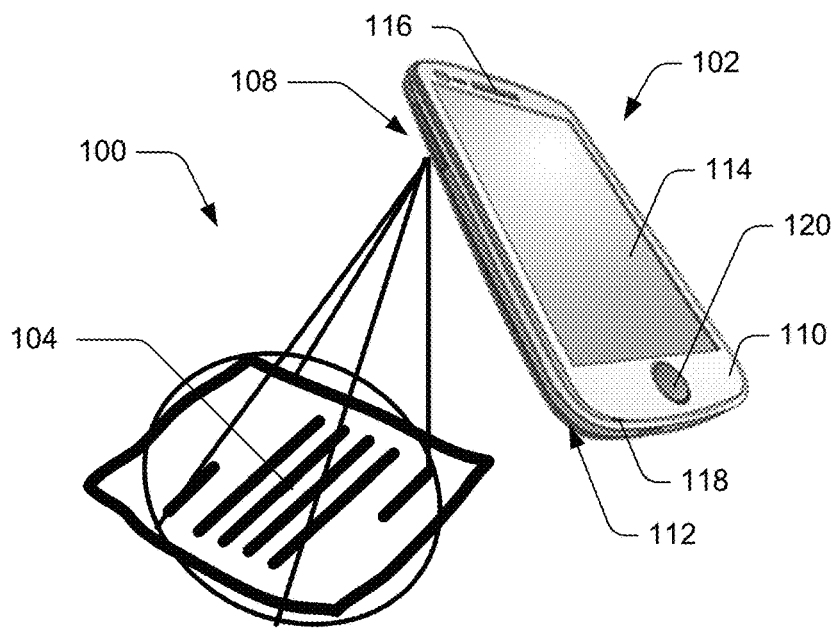

FIGS. 1A and 1B are illustrations of a digital medium environment 100 in an example implementation that is operable to employ document capture techniques described herein. FIG. 1A represents an illustration of an example mobile device 102 illuminating an object 104, such as a document, using a light source 106, and FIG. 1B represents an illustration of the example mobile device 102 capturing an image of the object 104 using an imager 108. The mobile device 102 may be any type of portable or transportable device having one or more optical imagers and capable of capturing and storing still images, videos, and/or multimedia. Examples of the mobile device 102 include, but are not limited to, wireless devices such as cellular phones and smartphones, tablet computing devices, personal digital assistants, personal navigation devices, touch screen input devices, touch or pen-based input devices, portable video and/or audio players, gaming devices, portable computing devices, such as notebook computers and laptops, and the like.

It is to be understood that the mobile device 102 may take the form of a variety of form factors, such as, but not limited to, bar, tablet, flip/clam, slider, rotator, and wearable form factors. The mobile device 102 may range from a low-resource device with limited memory and/or processing resources (e.g., mobile devices) to a full-resource device with substantial memory and processor resources (e.g., portable computers). Additionally, although a single mobile device 102 is shown, the mobile device may be representative of multiple different devices, such as multiple mobile devices utilized by a person or entity to perform operations over personal area network, ad hoc network, or peer-to-peer network.

The mobile device 102 may comprise a housing including a front surface 110 and a rear surface 112. The housing, including the front surface 110 and the rear surface 112, may support a variety of input components and output components. For example, the front surface 110 of the housing may include output components such as a display 114 to provide visual output to a user and a speaker 116 located at a top end of the mobile device 102 to provide audio output to the user. As another example, the front surface 110 of the housing may include input components such as a touch sensor overlaying the display 114, a microphone 118 located at a bottom end of the mobile device 102 opposite the top end, and one or more input keys 120 to activate associated functions of the mobile device. Examples of the input key or keys 120 include, but are not limited to, keys of an alpha or numeric keypad or keyboard, physical keys, touch-sensitive surfaces, mechanical surfaces, multipoint directional keys and side buttons or keys. Also, one or more of these components may operate individually, or in combination with other components, to constitute a user interface of the mobile device 102.

Similar to the front surface 110 of the housing, the rear surface 112 opposite the front surface may also include input components and output components. For example, the rear surface 112 of the housing includes a light source 106 as shown in FIG. 1A and an imager 108 as shown in FIG. 1B. In the alternative, or in addition, the front surface 110 of the housing may include an imager and a light source. The imager may be any type of optical imager capable of capturing still images, videos, and multimedia of the object 104. The imager may include one or more photodetectors or sensors including, but not limited to, charged coupled device (CCD), complementary metal-oxide-semiconductor (CMOS), backside illumination (BSI), ISOCELL, Stacked CMOS, RGBC sensors, and other light-sensitive components. The light source may be any type of light emitting component capable of illuminating the object 104 in conjunction with, or instead of, any other sources of light external to the mobile device 102. Examples of light sources include light emitting diode (LED), xenon, incandescent, fluorescent, and the like.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
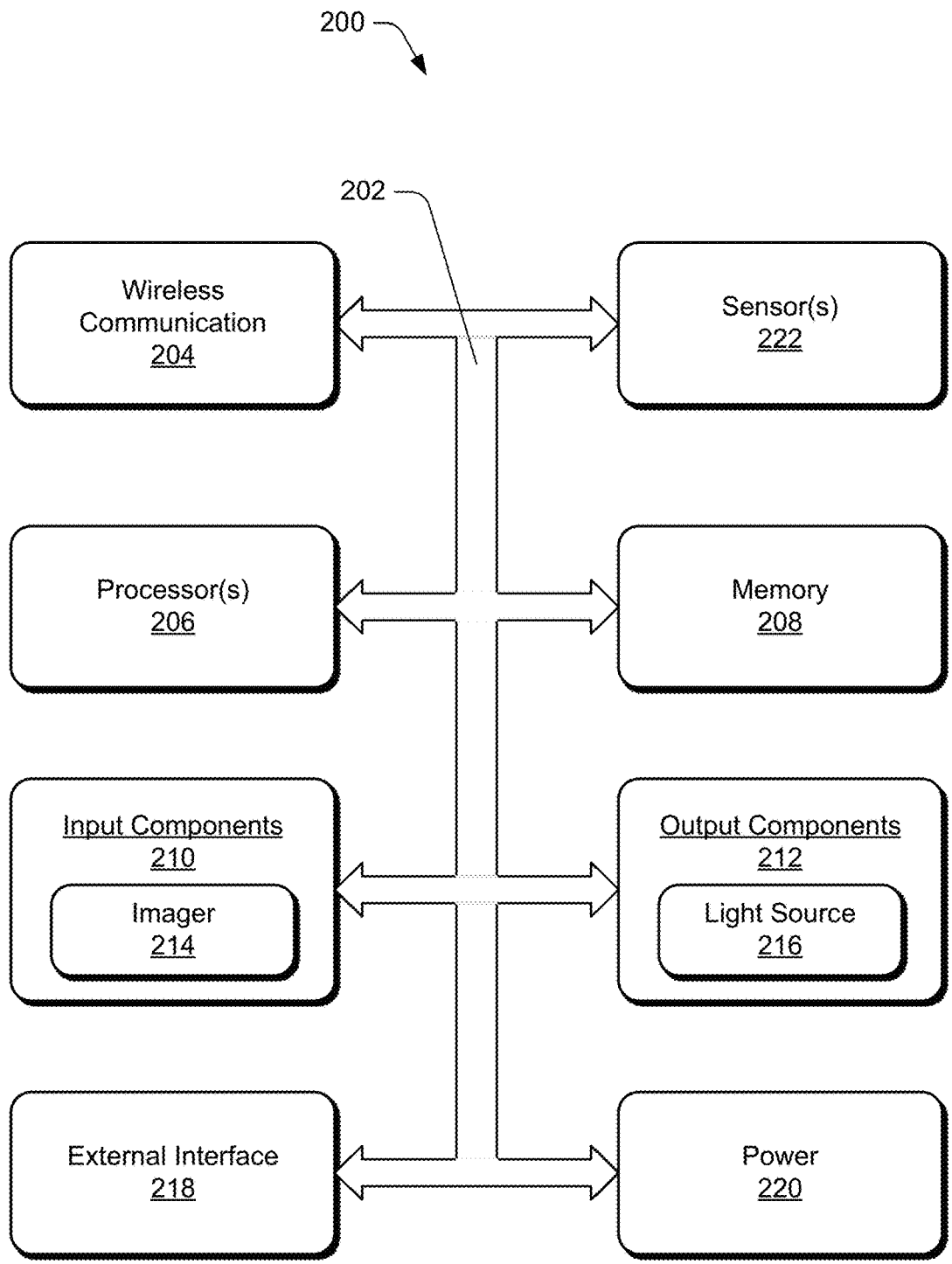
FIG. 2 is a block diagram depicting an example implement of the various internal components of the mobile device of FIG. 1.

Referring to FIG. 2, there is shown a block diagram representing example components 200 that may be used for one or more embodiments. The example components 200 may be interconnected by control lines, data lines, power lines, and/or a combination of these various lines, such as a communications bus 202. The example components 200 may include one or more wireless communication components 204, one or more processors 206, one or more memories 208, one or more input components 210, and one or more output components 212. Each wireless communication component 204 may include a wireless receiver, transmitter or transceiver. Each wireless communication component 204 may utilize wireless technology for communication, such as, but are not limited to, cellular-based communications such as analog communications (using AMPS), digital communications (using CDMA, TDMA, GSM, iDEN, GPRS, or EDGE), and next generation communications (using 5G, UMTS, WCDMA, LTE, or IEEE 802.16) and their variants. Each wireless communication component 204 may also, or in the alternative, utilize non-cellular based communications, such as, but are not limited to, peer-to-peer or ad hoc communications such as HomeRF, Bluetooth, BLE, and IEEE 802.11; and other forms of wireless communication such as infrared technology.

The processor 206 may generate commands based on information received from one or more wireless communication components 204, one or more input components 210, and/or one or more other components. The processor 206 may process the received information alone or in combination with other data, such as the information stored in the memory 208. Thus, the memory 208 of the example components 200 may be used by the processor 206 to store and retrieve data. The data that may be stored by the memory 208 include, but is not limited to, operating systems, applications, and data. Each operating system includes executable code that controls basic functions of the mobile device, such as interaction among the example components 200, communication with external devices via each wireless communication component 204 and/or the external interface (described below), and storage and retrieval of applications and data to and from the memory 208. The memory 208 includes multiple applications, and each application includes executable code utilizes an operating system to provide more specific functionality for the mobile device. Data is non-executable code or information that may be referenced and/or manipulated by an operating system or application for performing functions of the mobile device.

As stated above, the example components 200 may include the input components 210 and the output components 212. Some or all of the input components 210 and the output components are a part of the user interface of the mobile device 102. The input components receive information from one or more users and generate one or more signals to communication at least a portion of the information to other components of the mobile device 102. Examples of the input components 210 include, but are not limited to, mechanical devices such keyboards and other buttons, audio devices such as microphones and sound recognition systems, and electrical devices such as communication and transmission signals, and the like. Likewise, the output components 212 receive information from one or more components of the mobile device 102 and provides at least a portion of the information to one or more users of the device. The information, or portions thereof, may be provided to the one or more users in the form of video, audio, and/or mechanical outputs. For example, the output components 212 may include, but are not limited to, a video output component such as a cathode ray tube, liquid crystal display, plasma display, incandescent light, fluorescent light, front or rear projection display, and light emitting diode indicator. Other examples of output components 212 include an audio output component such as a speaker, alarm and/or buzzer, and/or a mechanical output component such as vibrating or motion-based mechanisms.

Some input components 210 and the output components 212 provide specialized functions and communicate automatically with the wireless communication component 204, the processor 206, the memory 208, and other components of the mobile device 102. Examples of these specialized functions include, but are not limited to, capacitive sensing, resistive sensing, motion sensing, vibration, light sensing and generating, image and video sensing, temperature sensing, moisture sensing, location determination, and the like. An imager 214 is an example of input component 210 that provides an image and video sensing function. The imager 214 is an optical instrument for recording or capturing images, such as still images, sequences of images constituting videos, or other forms of images constituting multimedia. A light source 216 is an example of an output component 212 that provides a light generating function. For a mobile device, the light source 216 often works in conjunction with the imager 214 to provide a short-duration of illumination or continuous illumination to cover the time when the imager captures an image, such as a still image or a video. The light source 216 may also operate separate from the imager 214 to provide continuous illumination similar to a torch or flashlight. For these reasons, the short-duration of illumination by the light source 216 is often referenced as the flash mode, and the continuous duration of illumination by the light source is often referenced as the torch mode.

The example components 200 may yet further include an external interface 218 to provide a direct connection to auxiliary components or accessories for additional or enhanced functionality. In addition, the example components 200 may include a power source or supply 220, such as a portable battery, for providing power to the other components and allow portability of the mobile device 102. Further, in addition to the input components 210 and the output components 212, the example components 200 may include one or more sensors 222 to provide further functionality or enhance existing functionality of the mobile device 102. For example, the example components 200 may include a light sensor to generate a light sensor value associated with an image, video, or multimedia. Thus, for some embodiments, a mobile device 102 may determine a brightness value for a particular image frame based on the light sensor value in addition to a brightness value determined based on an image acquired by the imager 214.

It is to be understood that FIG. 2 is provided for illustrative purposes only and for illustrating components of a mobile device and is not intended to be a complete schematic diagram of the various components required for a mobile device. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Document Capture Techniques

Figure 3:
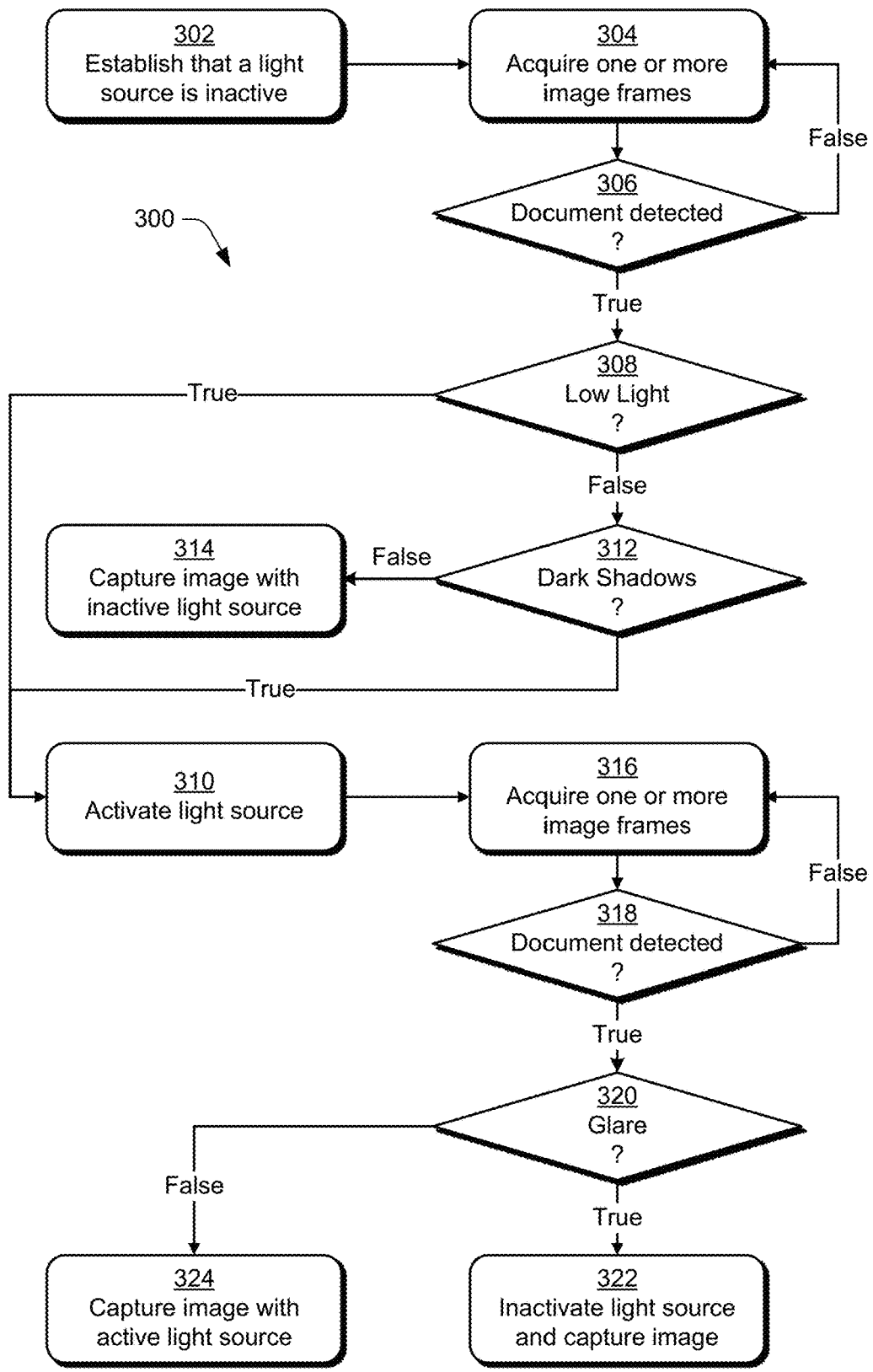
FIG. 3 depicts a flow diagram depicting a procedure in an example implementation that is operable to employ the document capture techniques described herein.

FIG. 3 depicts a flow diagram depicting a procedure in an example implementation that is operable to employ the document capture techniques described herein. The techniques are implemented in a mobile device 102 having an imager 214 and a light source 216 in an environment for real time detection of an object 104, such as a document. Documents are any type of object having visible text, writing, table, charts/graphs, detailed drawings, detailed photographs, or any combination of these elements. Examples of a document include, but are not limited to, documents including business documents, reports, book covers/pages, photographs, drawings, receipts, business cards, films, negatives, signs, whiteboards, and the like. The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

As shown in FIG. 3, the document capture techniques 300 analyze various aspects of image frames captured by the imager 214, such as low light level, shadow level, and glare level, before controlling or adjusting the light source 216 and capturing the final image or images. The order in which the method is described is not intended to be construed as a limitation, and any number or combination of the method operations can be combined in any order to implement a method, or an alternate method. Initially, the mobile device 102 establishes that the light source 216 is inactive at block 302 before the imager acquires a first image or images at block 304. In this example represented by FIG. 3, the first image is an image frame or the first images are image frames. The light source 216 is confirmed to be inactive, whether by inactivation or as a pre-existing condition, so that the acquired image frame or frames are subject to environmental lighting about the mobile device 102, which may include any type of lighting other than the light source 216 of the mobile device 102. For some embodiments, the imager 214 acquires multiple first image frames, and a document capture module executed by the imager 214 or the processor 206 identifies the first image or images based on the acquired first image frames.

The processor 206 or imager 214 may determine a suitable threshold (Threshold$_{TOTAL\_FRAME}$) for the number of frames to be considered for detection of a low light condition, or the threshold may be predetermined and stored in the memory 208. Threshold$_{TOTAL\_FRAME}$, the total number of frames acquired at block 304, is determined based on the time taken for one live edge detection frame on the mobile device 102. Threshold$_{TOTAL\_FRAME}$ may be lower for slower performing mobile devices, and Threshold$_{TOTAL\_FRAME}$ may be higher for faster performing mobile devices.

The mobile device 102 identifies one or more first images, which includes the step of detecting that the first image or images are positioned within an image frame of the imager 214 at step 306. For example, the mobile device 102 may perform a function of document boundary detection on the first image or images to detect the presence of any documents. For the document boundary detection function, the mobile device 102 determines that a document is detected if potential boundaries of the document are identified. If a document is not detected, then the mobile device 102 reverts back to step 304 to acquire more image frames for analysis again at step 306. If a document is detected based on the acquired image frame or frames, then the mobile device 102 proceeds with a low light detection function.

For the low light detection function, the mobile device determines whether a light level of the first image or images meet or exceed a low light threshold at step 308. The light level of an image frame is considered to meet or exceed the low light threshold if the light level is considered to be insufficient or poor, and the light level is below the low light threshold if the light level is considered to be sufficient for the purpose of document capture. The mobile device 102, such as the processor 206, the imager 214, and/or the document capture module, determines the brightness value for each image frame. The brightness value may be obtained from metadata of the image frame or calculated based on the image frame itself. For step 310, the mobile device 102 activates the light source 216 if the light level of the first image or images meet or exceed the low light threshold, i.e., the light level is insufficient for the purpose of document capture.

If the light level of the first image or images does not meet or exceed the low light threshold, then the light level is considered to be sufficient. In response, the mobile device 102 determines whether a shadow level of the first image or images meet or exceed a shadow threshold at step 312. The mobile device 102 checks the image frame or frames for the presence of shadows in the acquire image or images, particularly dark shadows having high contrast to surrounding areas. For the document capture techniques described herein, shadows are associated with document borders, so floating shadows that do not touch a document border do not trigger activation of the light source 216 in and of themselves. If the mobile device 102 determines that the light conditions are insufficient or identifies one or more shadows in the acquired image or images, then the mobile device proceeds to analyze potential glare of the object 104 in response to illumination by the light source 216.

As stated above, the mobile device 102 activates the light source 216 at step 310 if the light level of the first image or images meet or exceed the low light threshold at step 308. Similarly, the light source 216 is activated at step 310 in response to determining that the shadow level of the first image or images meet or exceed the shadow threshold at step 312, even though the light level is sufficient. For example, the mobile device 102 may determine that a contrast level between a shadow area and an area adjacent to the shadow area meets or exceeds the shadow threshold. This contrast detection would apply if the shadow area is darker than the area adjacent to the shadow area. If the light level of the first image or images does meet or exceed the low light threshold, then the mobile device 102 considers ambient environmental conditions to provide sufficient light without intrusive shadows. Under these acceptable ambient environmental conditions, the imager 214 may capture the final image without activating the light source 216 at step 314.

After activating the light source 216 at step 310, the mobile device 102 acquires a second image or images at step 316. For the embodiment represented by FIG. 3, the second image is an image frame or the second images are image frames. The light source 216 is activated so that the acquired image frame or frames may be evaluated for potential glare caused, at least in part, by the illumination from the light source. For some embodiments, the imager 214 acquires multiple second image frames, and the imager 214 or the processor 206 identifies the second image or images based on the acquired second image frames.

After identifying one or more second images acquired by the imager 214, the mobile device 102 identifies one or more second images, which includes the step of detecting that the second image or images are positioned within an image frame of the imager 214 at step 318. For example, the mobile device 102 may perform a function of document boundary detection on the second image or images to detect the presence of any documents. The mobile device 102 determines that a document is detected if potential boundaries of the document are identified. If a document is not detected, then the mobile device 102 reverts back to step 316 to acquire more image frames for analysis again at step 318. If a document is detected based on the acquired image frame or frames, then the mobile device 102 proceeds with a glare detection function.

The mobile device 102 determines whether a glare level of the second image or images meet or exceed a glare threshold in response to identifying the second image or images at step 320. For example, the mobile device 102 may determine that a contrast level between a glare area and an area adjacent to the glare area meets or exceeds the glare threshold. This contrast detection would apply if the glare area is lighter than the area adjacent to the glare area. If the mobile device 102 determines that the glare level meets or exceeds the glare threshold, then the light source 216 is inactivated and a final image is captured at the imager at step 322. If the mobile device determines that the glare level does not meet or exceed the glare threshold, then the final image is captured at the imager while the light source is active at step 324. Thereafter, the processor 206 and the memory 208 may perform post-processing of the final image to identify the document image from the final image.

Low Light Detection

FIGS. 4A-4D depict example implementations of document images acquired by the imager 214 of the mobile device 102. For these example implementations, the object 104 (shown in FIG. 1) is illuminated by ambient light provided by the environment in the proximity of the mobile device 102 for FIGS. 4A & 4B, and the object is illuminated by the light source 216 of the mobile device as well as the ambient light for FIGS. 4C & 4D. For situations where ambient light is insufficient for proper document capture, the light source 216 provides illumination to improve the image quality of the final image, which is apparent when comparing the outputs of these example implementations.

Figure 4A:
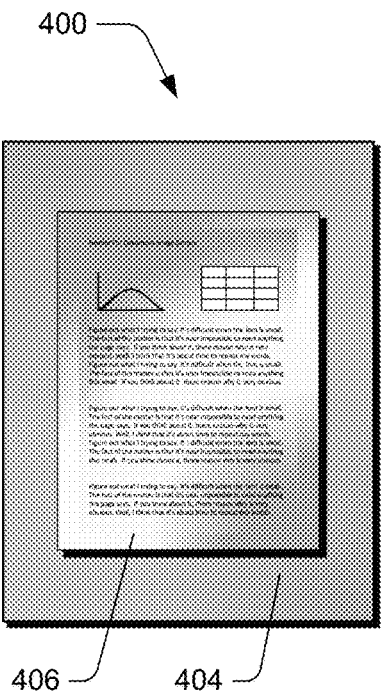
FIGS. 4A-4D depict example implementations of document images acquired by the imager with and without illumination from the light source.
Figure 4B:
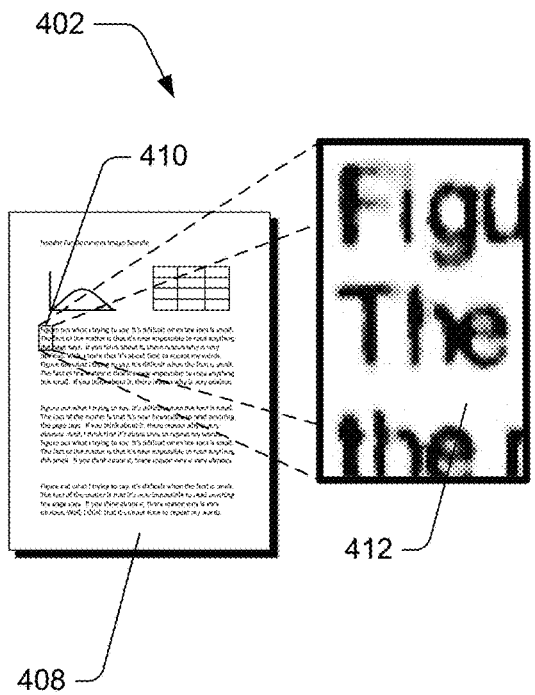

FIGS. 4A & 4B represent example implementations 400, 402 in which an image 404 of an object 104 (document image 406) is acquired by the imager 214 of the mobile device 102 under low light conditions. The object 104 is illuminated by ambient light while the light source 216 of the mobile device 102 is inactive. Referring to FIG. 4A, there is shown an example implementation 400 in which the acquired image 404 includes a document image 406 defined by the boundaries of the object 104. Due to the low light conditions, at least part of the document image 406 fails to receive sufficient light. FIG. 4B shows the example implementation 402 representing an enhanced output image 408 of the document image 406. The processor 206 provides an image enhancement process to enhance the various elements of the document image 406, such as text, graphics, and other document elements, for comprehension by mobile device 102 or a user of the mobile device. FIG. 4B includes a selected portion 410 of the enhanced output image 408 that is enlarged as a zoomed portion 412 to illustrate the quality of the output image. It is to be understood that the selected portion 410 of the enhanced output image 408 and the zoomed portion 412 are not part of the enhanced output image and are shown in FIG. 4B merely for the purpose of explaining the image quality. As shown, the zoomed portion 412 of the enhanced output image 408 is blurry and unclear.

Figure 4C:
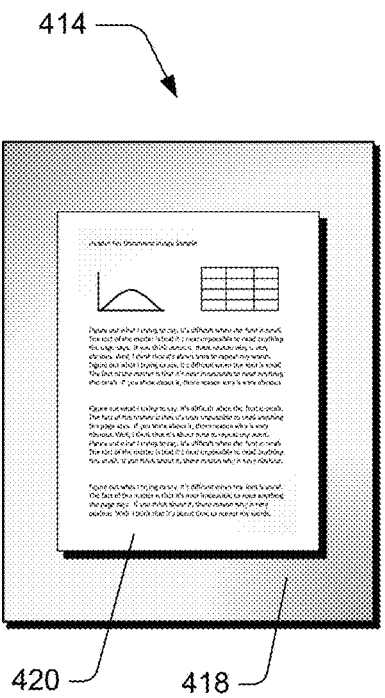
Figure 4D:
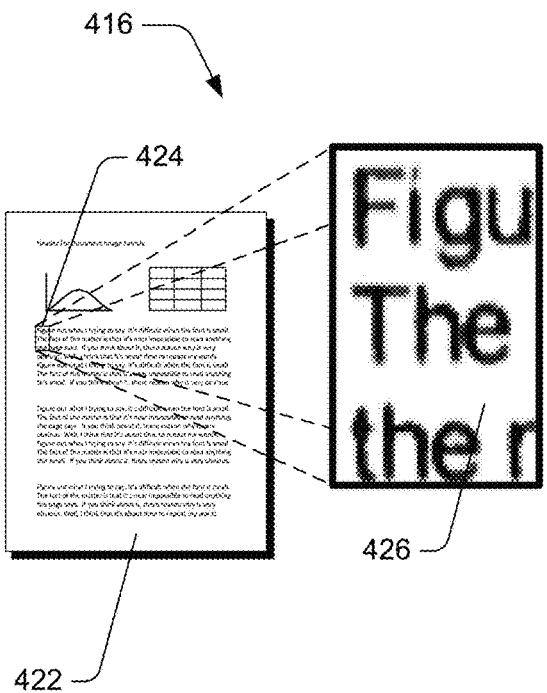

FIGS. 4C & 4D represent other example implementations 414, 416 in which an image 418 of the object 104 (document image 420) is acquired by the imager 214 of the mobile device 102 with added illumination by the light source 216 of the mobile device. The light source 216 of the mobile device 102 is active to supplement, or replace, any available ambient lighting. Referring to FIG. 4C, there is shown the example implementation 414 in which the acquired image 418 includes a document image 420 defined by the boundaries of the object 104. In comparing FIG. 4A to FIG. 4C, the document image 420 receives more lighting than the document image 406 of FIG. 4A. FIG. 4D shows an example implementation 416 representing an enhanced output image 422 of the document image 418. The processor 206 provides an image enhancing process to enhance the various elements of the document image 420, such as text, graphics, and other document elements, for comprehension by mobile device 102 or a user of the mobile device. The FIG. 4D includes a selected portion 424 of the enhanced output image 422 that is enlarged as a zoomed portion 426 to illustrate the quality of the output image. Similar to FIG. 4B, the selected portion 424 of the enhanced output image 422 and the zoomed portion 426 are not part of the enhanced output image and are shown in FIG. 4D merely for the purpose of explaining the image quality. As shown, the zoomed portion 426 of the enhanced output image 422 is distinct and clear, particularly in comparison to the comparable zoomed portion 412 of FIG. 4B.

The low light detection of the document capture techniques has several key aspects to generate the best possible enhanced output image. As stated above, the mobile device 102 determines a suitable threshold ($\text{Threshold}_{TOTAL\_FRAME}$) for the number of frames to be considered for detection of a low light condition, or the threshold may be predetermined and stored in the memory 208. The mobile device 102 then determines a brightness value for each image frame. The brightness value may be obtained from metadata associated with the image frame or determined based on an image processing technique. For some embodiments, the brightness value may be supplemented by a light sensor value generated by a sensor 222 of the mobile device 102, such as a light sensor. The mobile device 102 analyzes a selection of image frames, up to the threshold $\text{Threshold}_{TOTAL\_FRAME}$, based on certain conditions in order to determine whether the light level of the acquired image or images are sufficient or insufficient for document capture. For example, if the light levels of all images do not meet or exceed the low light threshold (i.e., the brightness values for all image frames are greater than the threshold (T)), then the ambient light of the images is sufficient. On the other hand, if the light levels of all images meet or exceed the low light threshold (i.e., the brightness values for all image frames are less than, or equal to, T), then the ambient light of the images is insufficient.

For situations where some image frames indicate sufficient ambient light whereas other image frames do not, then the mobile device 102 compares the number of image frames having light levels that meet or exceed the low light threshold to the number of image frames having light levels that do not meet or exceed the low light threshold. Based on this comparison, the mobile device 102 determines whether or not the images or image frames should be characterized as having a low light condition. For example, the mobile device 102 make the determination based on the results of the majority of the light levels for the $\text{Threshold}_{TOTAL\_FRAME}$ number of image frames. For another example, the mobile device may make the determination based on a Low Brightness Frame Count, in which the Low Brightness Frame Count is incremented if the brightness is less than, or equal to, the threshold T and decremented if the brightness is greater than the threshold T. For this latter example, if the Low Brightness Frame Count is greater than, or equal to, the $\text{Threshold}_{TOTAL\_FRAME}$, then the mobile device 102 confirms that the image or images are in a low light condition.

The low light detection of the document capture techniques may further include a Delta (D) to adjust the brightness threshold T due to potential low light detection of the initial image frame or frames due of the $\text{Threshold}_{TOTAL\_FRAME}$ frames. During the initial operation the imager 214, the initial frames acquired by the imager may appear darker than subsequent image frames. For that reason, the threshold T is adjusted by the Delta (D) in order to adjust for the initial frame or frames of the $\text{Threshold}_{TOTAL\_FRAME}$ frames to be analyzed. Delta (D) is an experimentally determined value which may different from mobile device-to-mobile device.

Dark Shadow Detection

FIGS. 5A-5D depict an example implementation 500 of a document image processed for dark shadow detection in accordance with the document capture techniques described herein. Where the low light detection of the acquired image or images results in a determination of sufficient lighting conditions for document capture, then the mobile device 102 proceeds with the dark shadow detection to check the presence of shadows in the image or images. Referring FIG. 5A of the example implementation 500, in particular, there is shown an acquired image 502 that includes a document image 504 representing the object 104. The acquired image 502 is acquired with the light source 216 being inactive, so the acquired image is designated as $I_{TORCH\_OFF}$, and the document boundary of the acquired image is designated as $BD_{TORCH\_OFF}$. The upper portion of the document image 504 is darker than the lower portion of the document image, so there is a possibility that the dark shadow detection will result in a detection of a shadow in the document image. Also, for this example, an isolated portion 506 at the lower portion of the document image 504 is darker than the remainder of the lower portion of the document image, so there is another possibility that a shadow will be detected in the document image.

Referring to FIG. 5B, the mobile device 102 determines the shadow mask $I_{LUMINANCE}$ of the acquired image 502. A shadow mask is a gray scale bitmap where each pixel is set to the highest luminance level in a configurable window surrounding the pixel in the original image. The technique for creating the shadow mask may include any suitable process for measuring luminance, such as the Y channel in the YCbC, color space or the L channel in the CIE-Lab color space. The values for the window under consideration are accumulated, and the highest value is chosen. Also, the shadow mask $I_{LUMINANCE}$ may be subjected to a smoothening filter in order to have smoother characteristics.

The determination of the document boundary region in the acquired image 502 ($I_{TORCH\_OFF}$) may be considered erroneous due to shadows in the acquire image or shadows in the image content and document image content. The document boundary region may include the non-document image region as well. To avoid this error, a suitable threshold is used to shrink the document boundary region at all sides of the document boundary to form an adjusted document boundary 508 ($BD_{TORCH\_OFF\_SHRINK}$). The adjusted document boundary 508 ($BD_{TORCH\_OFF\_SHRINK}$) resides within the original document boundaries of the document image 504.

Referring to FIG. 5C, the mobile device 102 determines a binarized image 510 $I_{BINARIZED}$ after determining the shadow mask $I_{LUMINANCE}$. The binarized image 510 $I_{BINARIZED}$ includes only two colors, such as the black and white pixels represented by FIG. 5C. The black pixels represent the darker pixels, which are below a binarization threshold and identified as shadow pixels for later analysis. The binarized image 510 $I_{BINARIZED}$ may be determined from the shadow mask $I_{LUMINANCE}$ by thresholding techniques with a suitable threshold value to reduce gray level images to binary images. The binarized image 510 $I_{BINARIZED}$ is cropped to correspond to the adjusted document boundary 508 ($BD_{TORCH\_OFF\_SHRINK}$) of the document image 504. As a result, the binarized image 510 $I_{BINARIZED}$ includes at least one shadow area 512 and at least one non-shadow area 514. Also, as shown in FIG. 5C, the isolated portion 506 has been binarized, along with the rest of the document image, resulting in a binarized isolated portion 516. The isolated portion 506 and the binarized isolated portion 516 are connected dark pixels that do not touch any of the document boundaries of the document and binarized images 504, 510. In order to be considered a shadow, for purposes of the dark shadow detection, a dark pixel or dark area must contact at least one document boundary.

Any binarized isolated portion 516 identified by binarizing a shadow mask corresponds to a dark object, so the binarized isolated portion is considered to be part of the image content and not a shadow. Thus, any binarized isolated portion 516 should be removed from the binarized image 510. A connected component analysis (CCA) may be applied to remove the binarized isolated portion 516. For the connected component analysis, all pixels of each binarized isolated portion 516 of the binarized image 510 $I_{BINARIZED}$ are identified. Any binarized isolated portion 516 that does not have one or more pixels touching the document boundary $I_{BINARIZED}$ is removed from the binarized image $I_{BINARIZED}$. After removal of the binarized isolated portion or portions 516 from the binarized image 510, the remaining portion of the binarized image is referred to as a binarized clean image 518 ($I_{BINARIZED\_CLEAN}$), as shown in FIG. 5D.

Referring to FIGS. 5A-5D together, for the next part of the dark shadow detection, the presence of shadows is determined based on the average values of the red, green and blue channels of a non-shadow area of the adjusted document boundary 508 ($BD_{TORCH\_OFF\_SHRINK}$), the binarized clean image 518 ($I_{BINARIZED\_CLEAN}$), and the acquired image 502 ($I_{TORCH\_OFF}$). The dark shadow detection determines the average red, green, and blue values from the non-shadow area 514 and the shadow area 512.

To determine the average red, green, and blue values from the non-shadow area 514, the mobile device 102 determines a non-shadow image block 520, 522 of suitable dimensions, within the non-shadow area 514 of the acquired image 502 ($I_{TORCH\_OFF}$) and the binarized clean image 518 ($I_{BINARIZED\_CLEAN}$). The non-shadow image block 520, 522 is within the adjusted document boundary 508 ($BD_{TORCH\_OFF\_SHRINK}$) of the acquired image 502 ($I_{TORCH\_OFF}$), and all pixels corresponding to the image block 522 in the binarized clean image 518 ($I_{BINARIZED\_CLEAN}$), should be lighter pixels. The average values of red, green, and blue components within the non-shadow image blocks 520, 522 may be identified as $R_{NON\_SHADOW}$, $G_{NON\_SHADOW}$, and $B_{NON\_SHADOW}$, respectively.

To determine the average red, green, and blue values from the shadow area 512, the mobile device 102 determines a shadow image block 524, 526 of suitable dimensions, within the shadow area 512 of the acquired image 502 ($I_{TORCH\_OFF}$) and the binarized clean image 518 ($I_{BINARIZED\_CLEAN}$). The shadow image block 524, 526 should be within the adjusted document boundary 508 ($BD_{TORCH\_OFF\_SHRINK}$) of the acquired image 502 ($I_{TORCH\_OFF}$), and all pixels corresponding to the image block 526 in the binarized clean image 518 ($I_{BINARIZED\_CLEAN}$), should be darker pixels. The average values of red, green, and blue components within the shadow image blocks 524, 526 may be identified as $R_{DARK\_SHADOW}$, $G_{DARK\_SHADOW}$, and $B_{DARK\_SHADOW}$, respectively.

For the final steps to determine the average red, green, and blue values from the non-shadow area 514 and the shadow area 512, the mobile device 102 determines the ratios of the red, green, and blue components corresponding to the non-shadow image blocks 520, 522 and the shadow image blocks 524, 526.

$$R_{RATIO} = R_{NON\_SHADOW} / R_{DARK\_SHADOW} \quad (1)$$

$$G_{RATIO} = G_{NON\_SHADOW} / G_{DARK\_SHADOW} \quad (2)$$

$$B_{RATIO} = B_{NON\_SHADOW} / B_{DARK\_SHADOW} \quad (3)$$

If the dark shadow detection confirms the presence of dark shadows, the light source 216 of the mobile device 102 is activated and the glare detection is executed. Otherwise, if the dark shadow detection confirms that there are no shadows, then the mobile device 102 captures the final image while the light source is inactivated.

Figure 6A:
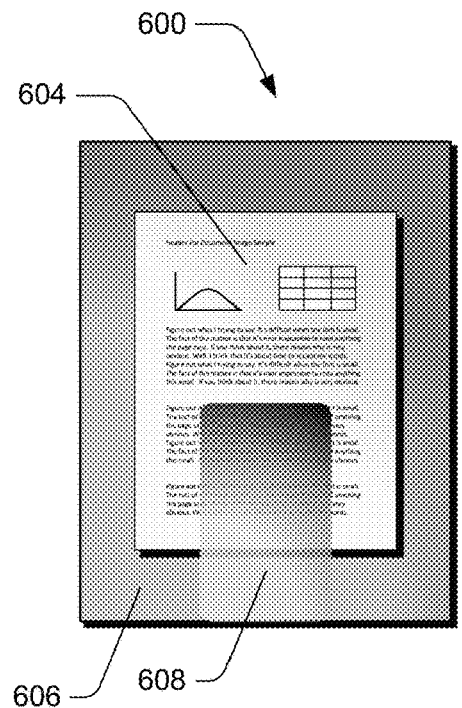
FIGS. 6A & 6B depict example implementations of an enhancing or cleaning process of the document images acquired by the imager with and without illumination by the light source of the mobile device.
Figure 6B:
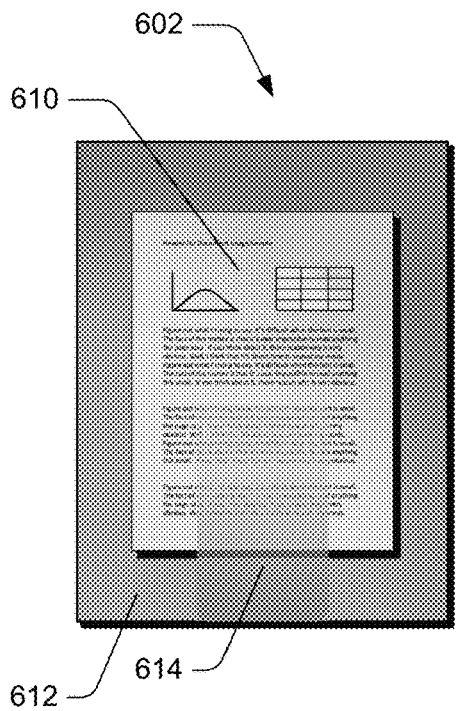

FIGS. 6A & 6B depict example implementations 600, 602 of a cleaning process of document images acquired by the imager in the presence of shadows. The dark shadow detection of the document capture techniques improves the ability of the mobile device 102 to clean a document subjected to one or more shadows. FIG. 6A depicts an example implementation 600 that represents a document image 604 of an image 606 processed by the dark shadow detection that is based on an object, obstructed by an intervening object 608, that received illumination by ambient light in proximity to the mobile device 102 while the light source 216 is inactive. FIG. 6B depicts another example implementation 602 that represents a document image 610 of an image 612 processed by the dark shadow detection that is based on an object, obstructed by an intervening object 614, that received illumination by the light source 216 of the mobile device 102 as well as, or in place of, the ambient light. An example of an intervening object 608, 614 is the mobile device 102 itself, when the mobile device is positioned between an ambient light source and the object of interest. As evident from a comparison of FIGS. 6A & 6B, activation of the light source 216 may assist with reducing any shadows by overcoming shadows caused by any intervening objects 608, 614. As a result, the quality of the final processed and cleaned image is improved significantly.

Glare Detection

Figure 7A:
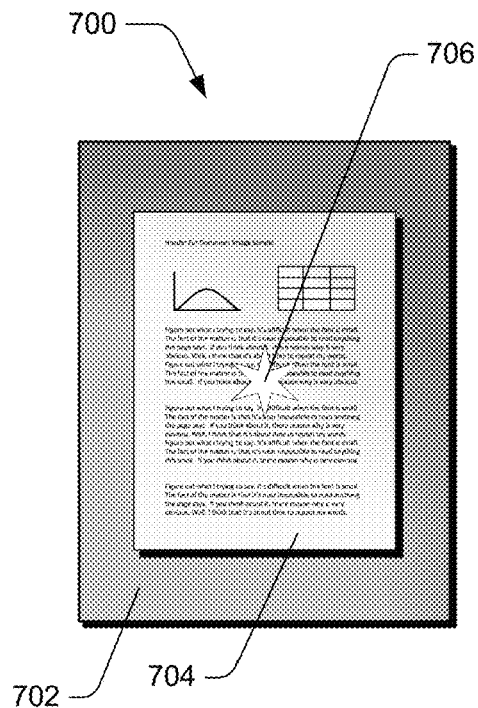
FIGS. 7A & 7B depict a document image processed for glare detection in accordance with the document capture techniques described herein.
Figure 7B:
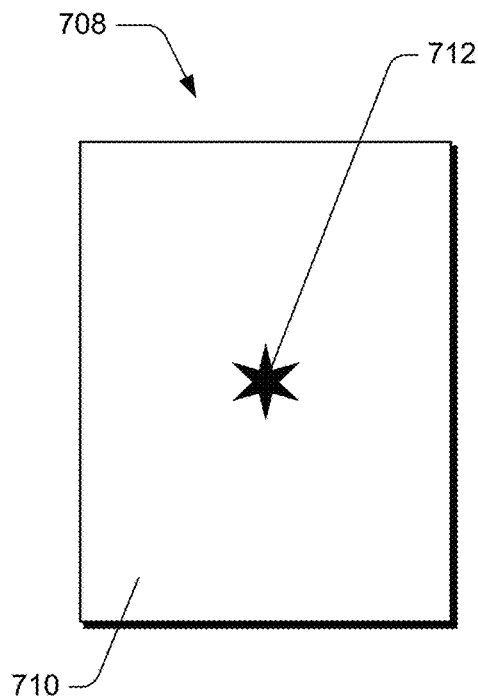

FIGS. 7A & 7B depict a document image processed for glare detection in accordance with the document capture techniques described herein. Where the low light detection of the acquired image or images results in a determination of insufficient lighting conditions for document capture, then the mobile device 102 proceeds with detection of potential glare. Also, where the dark shadow detection of the acquired image or images results in a determination of one or more shadow conditions for document capture, then the mobile device 102 proceeds with detection of potential glare.

Glare detection of the document capture techniques generally performs the function of activating the light source 216 of the mobile device 102 and determining whether the illumination provided to the object 104 by the light source causes significant glare for the document image to be captured. Accordingly, the initial steps for the glare detection are to activate the light source 216 and acquire one or more additional images (e.g., at steps 310 & 316 of FIG. 3), because the previously acquired images (e.g., at step 304 of FIG. 3) were acquired while the light source was inactive. FIG. 7A depicts an example implementation 700 that represents an acquired image 702 ($I_{TORCH\_ON}$) including a document image 704 representing an object 104 illuminated by the light source 216 of the mobile device 102. The document boundary of the acquired image 702 ($I_{TORCH\_ON}$) may be represented by $BD_{TORCH\_ON}$.

As shown in FIG. 7A, the document image 704 of the acquired image 702 ($I_{TORCH\_ON}$) may include a glare area 706, represented by a star in FIG. 7A. It should be noted that the shape of the glare area 706 is expected to be random and varying, so the star shown in FIG. 7A is merely intended to be a representation of the glare area and not an accurate depiction of the actual appearance of the glare area. The mobile device 102 determines an intensity maximized image ($I_{MAX\_INTENSITY}$) with respect to pixel density when comparing the document image 704 when the light sensor 216 is active and the light sensor is not active. The intensity maximized image $I_{MAX\_INTENSITY}$ assists the mobile device 102 to identify the additional glare pixels that are introduced as a result of activating the light source 216. For each pixel of the intensity maximized image $I_{MAX\_INTENSITY}$ while the light source 216 is inactive, the mobile device 102 determines the red, green, and blue component values ($R_{OFF}$, $G_{OFF}$, & $B_{OFF}$, respectively). The mobile device 102 also determines the average intensity Intensity$_{OFF}$ when the light source 216 is inactive based on ($R_{OFF}$, $G_{OFF}$, & $B_{OFF}$)/3. Likewise, for each pixel of the intensity maximized image $I_{MAX\_INTENSITY}$ while the light source 216 is active, the mobile device 102 determines the red, green, and blue component values ($R_{ON}$, $G_{ON}$, & $B_{ON}$, respectively). The mobile device 102 also determines the average intensity Intensity$_{ON}$ when the light source 216 is active based on [($R_{ON}$, $G_{ON}$, & $B_{ON}$)/3]. If the average intensity when the light source 216 is inactive Intensity$_{OFF}$ is greater than the average intensity when the light source is active Intensity$_{ON}$, then the mobile device 102 associates the red, green, and blue component values of each pixel of the intensity maximized image $I_{MAX\_INTENSITY}$ to be $R_{OFF}$, $G_{OFF}$, & $B_{OFF}$, respectively. If the average intensity when the light source 216 is active Intensity$_{ON}$ is greater than the average intensity when the light source is inactive Intensity$_{OFF}$, then the mobile device 102 associates the red, green, and blue component values of each pixel of the intensity maximized image $I_{MAX\_INTENSITY}$ to be $R_{ON}$, $G_{ON}$, & $B_{ON}$, respectively.

FIG. 7B depicts another example implementation 708 that represents a binarized image 710 ($I_{BINARIZED}$) of the intensity maximized image $I_{MAX\_INTENSITY}$ that is created by a thresholding technique with a suitable threshold value for shadows. The binarized image 710 ($I_{BINARIZED}$) includes only two colors, such as the black and white pixels represented by FIG. 7B. A darker pixel in the binarized image 710 ($I_{BINARIZED}$), such as the pixels in the binarized glare area 712, denotes that the pixel may be a glare pixel that was introduced to the image when the light source 216 was activated.

Figure 8:
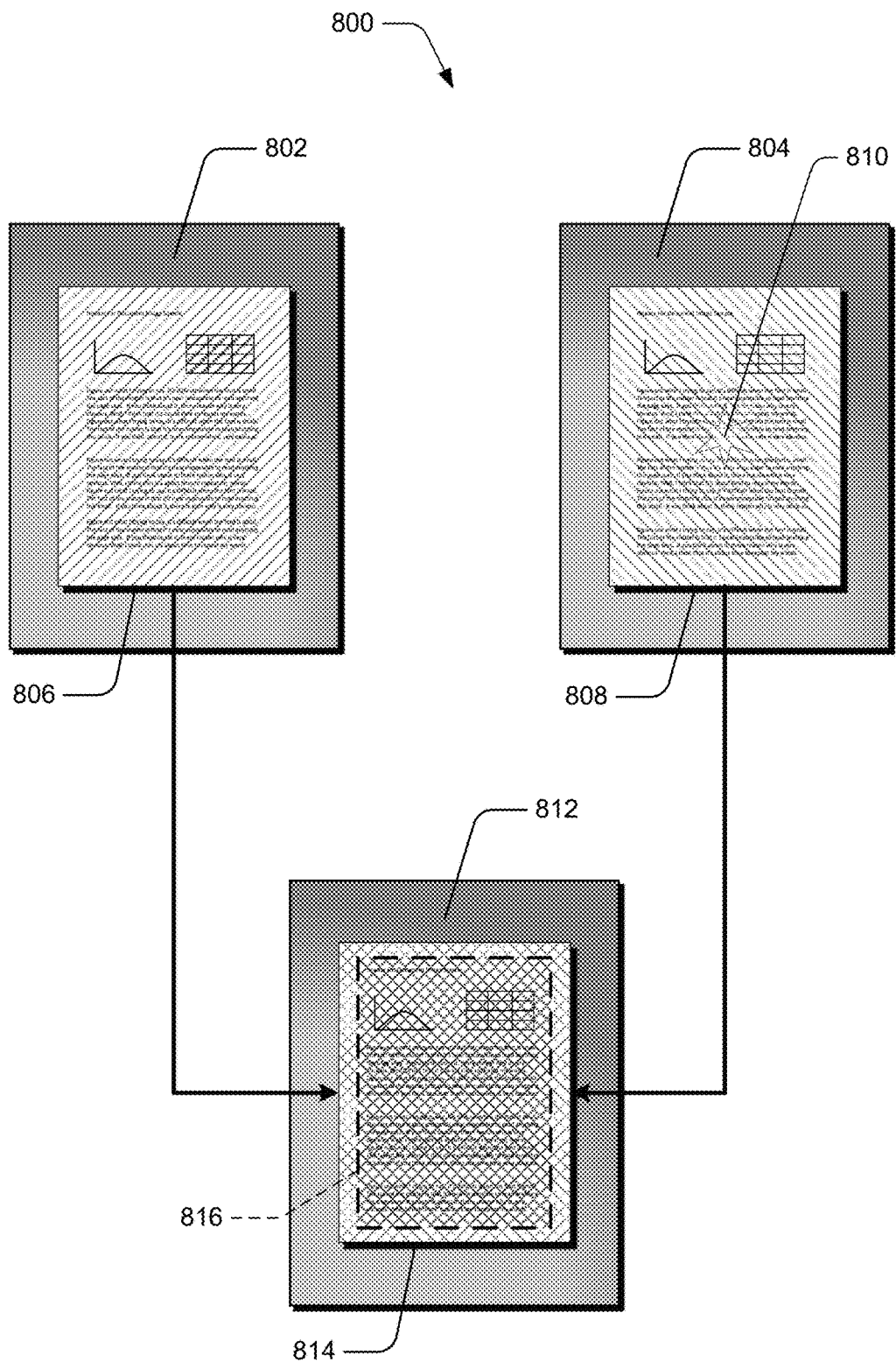
FIG. 8 depicts a document common region determination for glare detection based on illuminated and non-illuminated versions of a particular image.

FIG. 8 depicts an example implementation 800 of a document common region determination for glare detection based on a non-illuminated version 802 and an illuminated version 804 of a particular image. The non-illuminated version 802 of the image includes a non-illuminated document 806, and the illuminated version 804 of the image includes an illuminated document 808. As expected, the illuminated document 808 may include one or more glare areas 810. FIG. 8 also illustrates a combined image 812 that includes a combined document 814. The mobile device 102 determines a common document boundary region 816 ($BD_{COMMON\_REGION}$) from $BD_{TORCH\_OFF}$ of $I_{TORCH\_OFF}$ represented by the non-illuminated document 806 and $BD_{TORCH\_ON}$ of $I_{TORCH\_ON}$ represented by the illuminated document 808. The document boundary may change due to possible movement of the mobile device 102 during a user's attempt to capture the document image. Also, the document boundary region may include the non-document image region as well. To avoid this error, a suitable threshold is used to shrink the common document boundary region 816 ($BD_{COMMON\_REGION}$) at all sides of the document boundary.

In view of the common document boundary region 816 ($BD_{COMMON\_REGION}$) and the corresponding regions of the images $I_{TORCH\_ON}$ and $I_{TORCH\_OFF}$, the mobile device 102 determines the additional glare areas or pixels introduced as a result of activating the light source 216. For each pixel of the image $I_{TORCH\_OFF}$ while the light source 216 is inactive, the mobile device 102 determines the red, green, and blue component values ($R_{OFF}$, $G_{OFF}$, & $B_{OFF}$, respectively). The mobile device 102 also determines the average intensity Intensity$_{OFF}$ when the light source 216 is inactive based on [($R_{OFF}$, $G_{OFF}$, & $B_{OFF}$)/3]. Likewise, for each pixel of the image $I_{TORCH\_ON}$ while the light source 216 is active, the mobile device 102 determines the red, green, and blue component values ($R_{ON}$, $G_{ON}$, & $B_{ON}$, respectively). The mobile device 102 also determines the average intensity Intensity$_{ON}$ when the light source 216 is active based on [($R_{ON}$, $G_{ON}$, & $B_{ON}$)/3]. Further, the mobile device 102 determines a threshold Threshold$_{GLARE\_INTENSITY}$ on pixel intensity, or the threshold may be predetermined and stored in the memory 208, to determine whether a given pixel/area is a glare pixel/area or not. The mobile device 102 determines that the given pixel/area is a glare pixel/area if the average intensity $Intensity_{OFF}$ when the light source 216 is inactive is less than the pixel intensity threshold $Threshold_{GLARE\_INTENSITY}$, and the average intensity $Intensity_{ON}$ when the light source 216 is active is greater than the pixel intensity threshold $Threshold_{GLARE\_INTENSITY}$. As a result, the total number of glare pixels may be identified as $Total_{GLARE\_PIX\_COUNT}$.

Finally, for the glare detection, the mobile device 102 is ready to discard the images identified as glare images. The mobile device 102 sets a threshold $Threshold_{TOTAL\_GLARE\_COUNT}$ based on the total number of glare pixels of a particular image. If the glare region (or total glare pixels) is less than the threshold $Threshold_{TOTAL\_GLARE\_COUNT}$, then the mobile device 102 discards the images identified as glare images, including images identified as non-glare images with minor glare regions introduced in the image. If the $Total_{GLARE\_PIX\_COUNT}$ is greater than $Threshold_{TOTAL\_GLARE\_COUNT}$, then the image is considered to be a glare image that was introduced when the light source 216 was activated, so the final image should be captured after inactivating the light source. Otherwise, if the image is not considered to be a glare image, the image is captured while the light source 216 of the mobile device 102 is active.

Example System and Device

Figure 9:
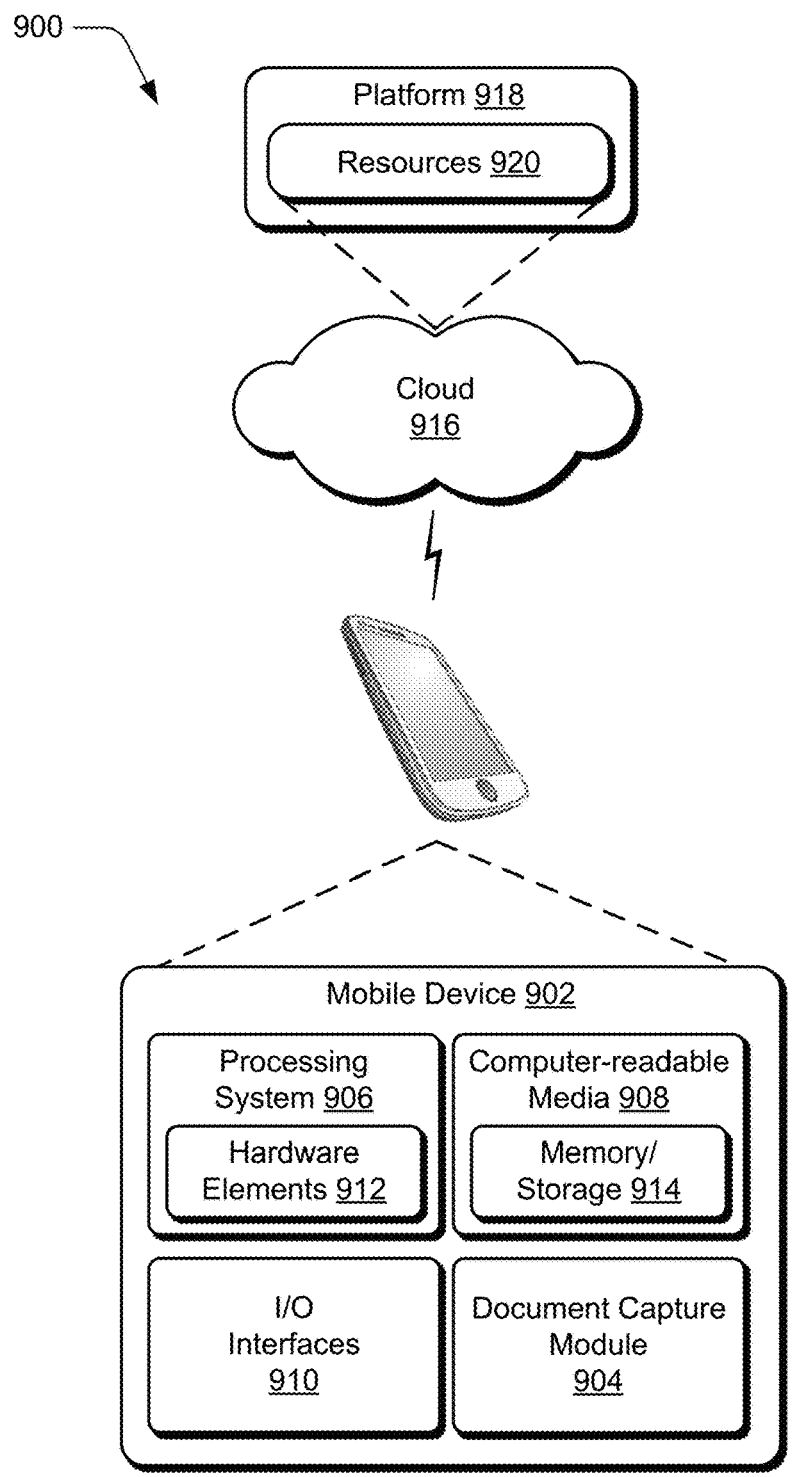
FIG. 9 illustrates an example system including various components of an example device that can be implemented as any type of mobile device as described and/or utilize with reference to FIGS. 1-8 to implement embodiments of the techniques described herein.

FIG. 9 illustrates an example system 900 that includes an example mobile device 902 that is representative of one or more computing systems and/or devices that may implement the various techniques described herein. This is illustrated through inclusion of a document capture module 904, which implements the document capture techniques described herein. The mobile device 902 may be, for example, a server of a service provider, a device associated with a client (e.g., a client device), an on-chip system, and/or any other suitable mobile device or computing system. Accordingly, the mobile device 902 should not be considered as restricted to the example implementation described in reference to FIG. 2 above.

The example mobile device 902 as illustrated includes a processing system 906, one or more computer-readable storage media 908, and one or more I/O interface 910 that are communicatively coupled, one to another. The mobile device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 906 is representative of functionality to perform one or more operations using hardware. Accordingly, the processing system 906 is illustrated as including hardware elements 912 that may be configured as processors, functional blocks, and so forth. This may include implementation in hardware as an application specific integrated circuit or other logic device formed using one or more semiconductors. The hardware elements 912 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 908 is illustrated as including memory/storage 914. The memory/storage 914 represents memory/storage capacity associated with one or more computer-readable media. The memory/storage 914 may include volatile media (such as random access memory (RAM)) and/or nonvolatile media (such as read only memory (ROM), Flash memory, optical disks, magnetic disks, and so forth). The memory/storage 914 may include fixed media (e.g., RAM, ROM, a fixed hard drive, and so on) as well as removable media (e.g., Flash memory, a removable hard drive, an optical disc, and so forth). The computer-readable storage media 908 may be configured in a variety of other ways as further described below.

Input/output interface(s) 910 are representative of functionality to allow a user to enter commands and information to mobile device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the mobile device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the mobile device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the mobile device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 912 and computer-readable storage media 908 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 912. The mobile device 902 may be configured to implement particular instructions and/or functions corresponding to the software and/or hardware modules. Accordingly, implementation of a module that is executable by the mobile device 902 as software may be achieved at least partially in hardware, e.g., through use of computer-readable storage media and/or hardware elements 912 of the processing system 906. The instructions and/or functions may be executable/operable by one or more articles of manufacture (for example, one or more mobile devices 902 and/or processing systems 906) to implement techniques, modules, and examples described herein.

The techniques described herein may be supported by various configurations of the mobile device 902 and are not limited to the specific examples of the techniques described herein. This functionality may also be implemented all or in part through use of a distributed system, such as over a "cloud" 916 via a platform 918 as described below.

The cloud 916 includes and/or is representative of a platform 918 for resources 920. The platform 918 abstracts underlying functionality of hardware (e.g., servers) and software resources of the cloud 916. The resources 920 may include applications and/or data that can be utilized while computer processing is executed on servers that are remote from the mobile device 902. Resources 920 can also include services provided over the Internet and/or through a subscriber network, such as a cellular or Wi-Fi network.

The platform 918 may abstract resources and functions to connect the mobile device 902 with other mobile devices. The platform 918 may also serve to abstract scaling of resources to provide a corresponding level of scale to encountered demand for the resources 920 that are implemented via the platform 918. Accordingly, in an interconnected device embodiment, implementation of functionality described herein may be distributed throughout the system 900. For example, the functionality may be implemented in part on the mobile device 902 as well as via the platform 918 that abstracts the functionality of the cloud 916.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In an environment for real time analysis of a document image to be captured, a method implemented by a mobile device having an imager and a light source, the method comprising:
    capturing a first pre-image by the imager with the light source inactive;
    determining whether a light level of the first pre-image meets or exceeds a low light threshold, the light level below the low light threshold being sufficient for document capture with the light source inactive;
    determining whether a shadow level of the first pre-image meets or exceeds a shadow threshold in response to the determining the light level of the first pre-image is sufficient for the document capture, the shadow level below the shadow threshold being sufficient for the document capture with the light source inactive;
    capturing a second pre-image by the imager with the light source active in response to the determining the light level of the first pre-image meets or exceeds the low light threshold or in response to the determining the shadow level of the first pre-image meets or exceeds the shadow threshold; and
    capturing a final image by the imager with the light source inactive based on a glare level of the second pre-image meets or exceeds a glare threshold, the glare level above the glare threshold being insufficient for the document capture with the light source active.

2. The method as described in claim 1, wherein:
    the first pre-image includes a plurality of first image frames captured with the light source inactive; and
    the second pre-image includes a plurality of second image frames captured with the light source active.

3. The method as described in claim 1, further comprising capturing the final image by the imager with the light source active based on the glare level of the second pre-image does not meet or exceed the glare threshold.

4. The method as described in claim 1, wherein the capturing the final image by the imager with the light source inactive is in response to the determining the shadow level of the first pre-image does not meet or exceed the shadow threshold.

5. The method as described in claim 1, wherein the capturing the first pre-image includes detecting the first pre-image is positioned within an image frame of the imager.

6. The method as described in claim 1, wherein:
    the determining whether the shadow level of the first pre-image meets or exceeds the shadow threshold includes determining that a contrast level between a shadow area and an area adjacent to the shadow area meets or exceeds the shadow threshold, wherein the shadow area is darker than the area adjacent to the shadow area; and the glare level of the second pre-image meets or exceeds the glare threshold comprises determining that a contrast level between a glare area and an area adjacent to the glare area meets or exceeds the glare threshold, wherein the glare area is lighter than the area adjacent to the glare area.

7. The method as described in claim 1, further comprising post-processing the final image to identify the document image from the final image.

8. A mobile device implemented for image analysis of document images for document capture in a digital medium environment, the mobile device comprising:
an imager configured to capture pre-images and images for the document capture;
a light source configured to activate or remain inactive to capture the pre-images and the images of the document for the document capture;
a document capture module implemented at least partially in computer hardware to:
initiate the imager to capture a first pre-image with the light source inactive;
determine whether a light level of the first pre-image meets or exceeds a low light threshold, the light level below the low light threshold being sufficient for document capture with the light source inactive;
determine whether a shadow level of the first pre-image meets or exceeds a shadow threshold in response to the light level of the first pre-image being determined sufficient for the document capture, the shadow level below the shadow threshold being sufficient for the document capture with the light source inactive;
initiate the imager to capture a second pre-image with the light source active in response to the light level of the first pre-image determined to meet or exceed the low light threshold, or in response to the shadow level of the first pre-image determined to meet or exceed the shadow threshold; and
initiate the imager to capture a final image with the light source inactive based on a glare level of the second pre-image determined to meet or exceed a glare threshold, the glare level above the glare threshold being insufficient for the document capture with the light source active.

9. The mobile device as described in claim 8, wherein the imager is configured to:
capture the first pre-image as multiple first image frames captured with the light source inactive; and
capture the second pre-image as multiple second image frames captured with the light source active.

10. The mobile device as described in claim 8, wherein the document capture module is implemented to initiate the imager to capture the final image with the light source active based on the glare level of the second pre-image determined not to meet or exceed the glare threshold.

11. The mobile device as described in claim 8, wherein the document capture module is implemented to initiate the imager to capture the final image with the light source inactive based on the shadow level of the first pre-image determined not to meet or exceed the shadow threshold.

12. The mobile device as described in claim 8, wherein the document capture module is implemented to detect that the first pre-image is positioned within an image frame of the imager, and initiate the imager to capture a first pre-image.

13. The mobile device as described in claim 8, wherein:

to determine whether the shadow level of the first pre-image meets or exceeds the shadow threshold, the document capture module is implemented to determine that a contrast level between a shadow area and an area adjacent to the shadow area meets or exceeds the shadow threshold, the shadow area being darker than the area adjacent to the shadow area; and to determine whether the glare level of the second pre-image meets or exceeds the glare threshold, the document capture module is implemented to determine that a contrast level between a glare area and an area adjacent to the glare area meets or exceeds the glare threshold, the glare area being lighter than the area adjacent to the glare area.

14. The mobile device as described in claim 8, wherein the document capture module is implemented to post-process the final image for the document capture.

15. A method implemented by document capture module of a computing device for image analysis of document images for document capture, the method comprising:
determining whether a light level of a first pre-image meets or exceeds a low light threshold, the light level below the low light threshold being sufficient for the document capture with a light source inactive;
determining whether a shadow level of the first pre-image meets or exceeds a shadow threshold in response to the determining the light level of the first pre-image is sufficient for the document capture, the shadow level below the shadow threshold being sufficient for the document capture with the light source inactive;
initiating an imager to capture a second pre-image with the light source active in response to the determining the light level of the first pre-image meets or exceeds the low light threshold or in response to the determining the shadow level of the first pre-image meets or exceeds the shadow threshold; and
initiating the imager to capture a final image with the light source inactive based on a glare level of the second pre-image meets or exceeds a glare threshold, the glare level above the glare threshold being insufficient for the document capture with the light source active.

16. The method as described in claim 15, wherein:
the first pre-image is captured as multiple first image frames captured with the light source inactive; and
the second pre-image is captured as multiple second image frames captured with the light source active.

17. The method as described in claim 15, further comprising:
initiating the imager to capture the final image with the light source active based on the glare level of the second pre-image does not meet or exceed the glare threshold.

18. The method as described in claim 15, wherein the initiating the imager to capture the final image by the imager with the light source inactive is in response to the determining the shadow level of the first pre-image does not meet or exceed the shadow threshold.

19. The method as described in claim 15, further comprising:
detecting that the first pre-image is positioned within an image frame of the imager; and
initiating the imager to capture the first pre-image with the light source inactive.

20. The method as described in claim 15, wherein:
the determining whether the shadow level of the first pre-image meets or exceeds the shadow threshold includes determining that a contrast level between a shadow area and an area adjacent to the shadow area meets or exceeds the shadow threshold, the shadow area being darker than the area adjacent to the shadow area; and the glare level of the second pre-image meets or exceeds the glare threshold comprises determining that a contrast level between a glare area and an area adjacent to the glare area meets or exceeds the glare threshold, the glare area being lighter than the area adjacent to the glare area.

\* \* \* \* \*